(12) United States Patent
Färber

(10) Patent No.: US 6,631,261 B1
(45) Date of Patent: Oct. 7, 2003

(54) MOBILE STATION FOR ADAPTATION TO A RADIO INTERFACE ACCESS METHOD THAT IS SUPPORTED BY A MOBILE RADIO TELEPHONE NETWORK, AND METHOD AND COMMUNICATION SYSTEM FOR ADAPTING SAME

(75) Inventor: Michael Färber, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,810

(22) PCT Filed: Jul. 31, 1998

(86) PCT No.: PCT/DE98/02192

§ 371 (c)(1),
(2), (4) Date: Feb. 14, 2000

(87) PCT Pub. No.: WO99/08391

PCT Pub. Date: Feb. 18, 1999

(30) Foreign Application Priority Data

Aug. 12, 1997 (DE) .......................... 197 34 933

(51) Int. Cl.[7] .................................. H04Q 7/22
(52) U.S. Cl. ..................... 455/432; 455/552
(58) Field of Search ................. 455/552, 3.02, 455/432, 433, 435

(56) References Cited

U.S. PATENT DOCUMENTS

| | | | | |
|---|---|---|---|---|
| 5,613,204 A | * | 3/1997 | Haberman et al. | 455/432 |
| 5,790,952 A | * | 8/1998 | Seazholtz et al. | 455/432 |
| 5,915,214 A | * | 6/1999 | Reece et al. | 455/406 |
| 5,950,130 A | * | 9/1999 | Coursey | 455/432 |

FOREIGN PATENT DOCUMENTS

| | | |
|---|---|---|
| DE | 195 33 507 C2 | 3/1997 |
| DE | 195 49 148 A1 | 7/1997 |
| WO | WO 97/05707 | 2/1997 |

\* cited by examiner

Primary Examiner—Nay Maung
Assistant Examiner—Nick Corsaro
(74) Attorney, Agent, or Firm—Bell, Boyd & Lloyd LLC

(57) ABSTRACT

A mobile station, as well as a method and communication system for adapting same, is provided. The mobile station is located in a radio coverage area of a mobile radiotelephone network and generates an adaptation to a radio interface access method of the mobile radiotelephone network based on signaling information that is transmitted on a pilot channel. The pilot channel is sent by at least one broadcast transmitting station of a public broadcast system in the radio coverage area of the mobile radiotelephone network and received and evaluated by the mobile station.

21 Claims, 3 Drawing Sheets

Datenpaket DP

RDS-Rahmen

MOBILE STATION FOR ADAPTATION TO A RADIO INTERFACE ACCESS METHOD THAT IS SUPPORTED BY A MOBILE RADIO TELEPHONE NETWORK, AND METHOD AND COMMUNICATION SYSTEM FOR ADAPTING SAME

BACKGROUND OF THE INVENTION

1. Field of the Invention

The present invention relates, generally, to a mobile station for adaptation to a radio interface access method which is supported by a mobile radio telephone network and, more specifically, to a method and communication system for adapting such a mobile station to a radio interface access method wherein known disadvantages relating to limited transmission capacity may be avoided.

2. Description of the Prior Arts

In mobile radiotelephone systems of the third generation such as UMTS (Universal Mobile Telecommunication System), a variety of radio interface technologies probably both be used for radio transmission between base stations of a mobile radiotelephone network and mobile stations. However, different radio interface technologies means different radio interface access methods. In the document "Tdoc SMG2 UMTS 52/97" (ETSI STC SMG2 UMTS ad hoc of Apr. 8–10, 1997 in Lulea Sweden: pp 1–2), the use of a global pilot channel on a frequency or, respectively, in a frequency spectrum, that is uniform throughout the world is proposed in order to allow a mobile subscriber the possibility of worldwide access to every local mobile radiotelephone network. On this pilot channel, information is transmitted to the mobile stations with the aid of which the mobile stations can adapt to the radio interface access method of a local mobile radiotelephone network. A mobile station that is suitable for this adaptation capability must be multimode capable; that is, all components that are required for the adaptation to the access method are embodied in the mobile station, and the information transmitted on the pilot channel serves merely to switching between the respective components that are used in the access method.

The disadvantage of this method is that a frequency, or a respectively, a frequency spectrum, must be reserved worldwide for the pilot channel. Because radio frequencies are only available to a limited extent, this pilot channel is designed very simple and with a limited transmission capacity in order to be able to use it in all mobile radiotelephone systems. However a low transmission capacity would condition the use of the above-described multimode mobile stations exclusively.

It is taught in "Software Radio Technology Challenges and Opportunities First European Workshop on Software Radios" (J. Mitola, Software Radio Workshop, May 29, 1997, Brussels: p 2 and 3) that mobile stations can be adapted to different radio interface technologies by programming modules. For instance, adaptation to a multiplex method (FDMA,TDMA,CDMA or hybrids), to a radio interface (channel coding, error protocols, etc.), or to a modulation method can be accomplished.

The possibility of utilizing mobile stations which implement a radio interface access method using programming modules that can be downloaded from the base stations would be out of the question given the use of the above-described pilot channel, the reason for this is that the transmission capacity would not be sufficient for a transmission of larger programming modules in particular.

GB 2 294 844 teaches a communication system in which several communication systems are connected by means of a central connection system. A list of the available communication systems and their specific characteristics is transmitted to a subscriber station upon request by a shared communication system. When a suitable communication system has been selected by the subscriber station, a corresponding program is sent by the shared communication system. With the aid of this program, the subscriber station then executes a configuration onto the selected communication system.

The present invention is, therefore, directed to each of a method, a mobile station and a communication system that avoids the above-described disadvantages related to the limited transmission capacity of the pilot channel.

SUMMARY OF THE INVENTION

Accordingly, the present invention is directed to a mobile station situated in a radio coverage area of a mobile radiotelephone network which generates an adaptation to a radio interface access method that is supported by this mobile radiotelephone network. The method includes the sending of a pilot channel by at least one broadcast transmitting station of a public broadcast system in the radio coverage area of the mobile radiotelephone network and its reception by the mobile station. Signaling information about at least one radio interface access method that is supported by the mobile radiotelephone network is transmitted on the pilot channel.

The mobile station then evaluates this signaling information, selects a radio interface access method, and generates an adaptation to the selected radio interface access method.

In an embodiment of the present invention, the pilot channel is sent together with RDS information, preferably periodically, on at least one radio transmission channel in a frequency spectrum of a public broadcast system in the region of the radio coverage by the mobile radiotelephone network.

In a further embodiment, the pilot channel receiver in the mobile station is designed as an FM receiver with an RDS decoder embodied therein, in order to detect a radio transmission channel that conducts RDS information in the frequency spectrum of the public broadcast system and to receive the pilot channel.

The use of the infrastructure of the public broadcast system has the advantages that the frequency spectrum for public broadcast systems is nearly identical across the world (for instance 87.5–108 Mhz), and that the transmission of the RDS information proceeds according to a standardized method. Furthermore, the worldwide infrastructure of the broadcast systems already in existence, which has a nearly total coverage of the terrestrial regions, as well as the economical FM receiver technology that is available in highly integrated form, contribute to a simple and cost-effective embodiment of the present invention. An integration of the FM receiver technology does not mean a significant rise in the share of costs or a greater complexity of the mobile station.

In another embodiment of the present invention, at least one broadband transmission channel that has a high transmission capacity is indicated with the aid of a pointer which is transmitted on the pilot channel.

At least one programming module for a program-based adaptation of the mobile station to the selected radio interface access method from a programming standpoint is transmitted on the broadband channel, preferably periodically.

Moreover, an adaptation device in the mobile station generates an adaptation of the mobile station to the selected radio service access method using the programming modules.

The broadband transmission channel preferably is sent in a frequency spectrum of a digital broadcast system by at least one digital broadcast transmitting station in the radio coverage area of the mobile radiotelephone network.

A digital broadband receiver in the mobile station that is laid out to the frequency spectrum of the digital broadcast system detects the broadband transmission channel indicated by the pointer and receives the programming modules. This development has the advantage that the technology of the digital broadband receiver, like that of the FM receiver, is available in highly integrated form and at a low price. Furthermore, the digital broadcast system offers nearly worldwide coverage coupled with a high transmission capacity that is far higher than the capacity of a transmission channel of a mobile radiotelephone network.

The beneficial effect of this described embodiment is that the pilot channel with the signaling information can be designed so as to be very narrowband, in order to make global signaling information of the mobile radiotelephone network that is relevant for the selection of the radio interface access method available to the mobile station. Based on this signaling information, a multimode capable mobile station can generate an adaptation to a radio interface access method. A mobile station with the capability of program-based adaptation to a radio interface access method is directed by the pointer to the broadband transmission channel on which the programming modules are sent. This design enables the use of a variety of types of mobile stations.

In a further embodiment of the present invention, the programming modules may, be transmitted on the broadband transmission channel in at least one data packet. In this case, the mobile station can contain a data packet memory in which the received data packets are stored. Given the placement of ahead word or a frame check sum at the front and back of each data packet, respectively, it can be checked in an evaluating device of the mobile station whether all data packets required for the adaptation to the selected radio interface access method have been received. A beneficial effect of this development is that the mobile station can begin to receive the data packets that are periodically transmitted on the broadband transmission channel at any time in order to generate the adaptation to the selected radio interface access method subsequent to complete reception.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
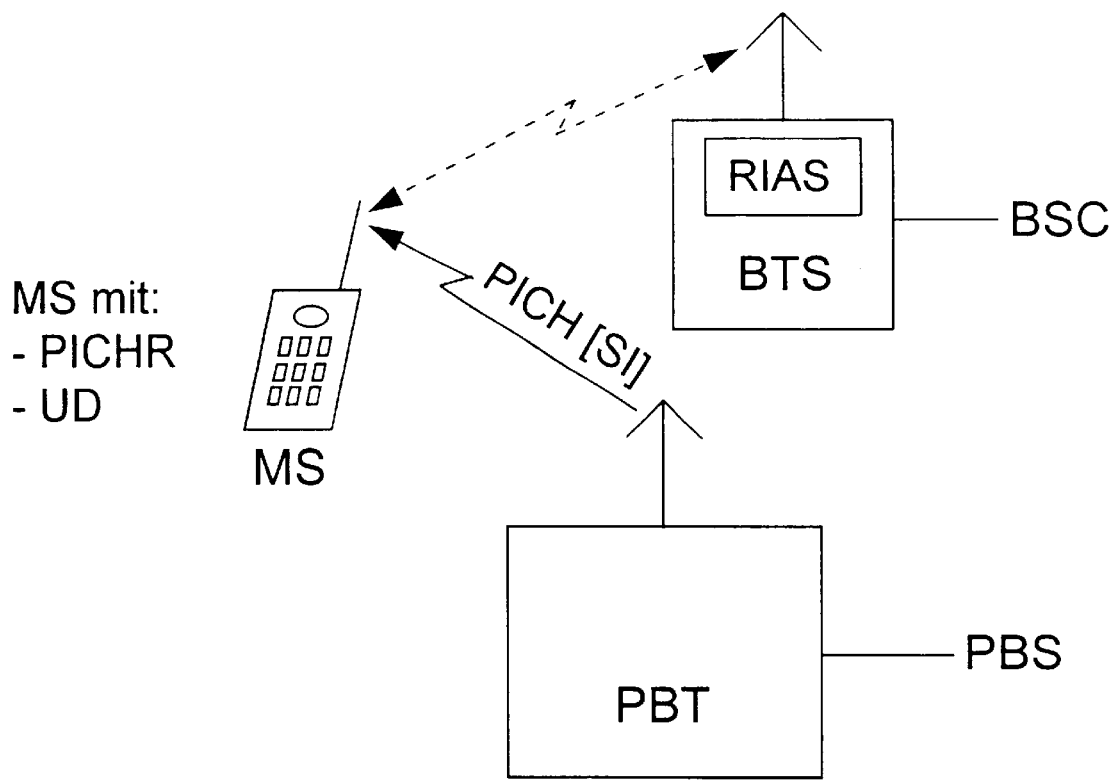
FIG. 1 shows a part of a communication system wherein a mobile station receives signaling information that was transmitted on a pilot channel by a broadcast transmitting station of a public broadcast system.

The part of a communication system illustrated in FIG. 1 includes a base station BTS that supports at least one radio interface access method RIAS which is valid for the appertaining mobile radiotelephone network. The base station BTS is connected to additional components of the mobile radiotelephone network that are of no significance to the present invention; in accordance with the generally known prior art. A mobile station MS located in the radio coverage area of the base station BTS or of the mobile radiotelephone network, respectively, receives a pilot channel PICH that is sent by a broadcast transmitting station PBT of a public broadcast system PBS. To receive this pilot channel PICH, the mobile station MS is equipped with a pilot channel receiver PICHR that is tuned to the frequency of the pilot channel PICH. Signaling information SI about at least one radio interface access method RIAS of the mobile radiotelephone network, which is transmitted on the pilot channel PICH, is evaluated in an evaluating device UD that is embodied in the mobile station MS. With the aid of the signaling information SI, the evaluating device UD selects a radio interface access method RIAS and generates an adaptation of the mobile station MS to this radio interface access method RIAS. The signaling information SU is made available to the public broadcast system PBS, for instance by the network operator of the mobile radiotelephone network.

An example of a mobile station MS of such construction is a multimode capable mobile station MS in which components for various radio interface access methods RIAS are integrated. Based on the signaling information SI, the respective components that are to be used for the selected radio interface method RIAS are selected in the evaluating device UD. The radio interface access methods RIAS can be characterized by different frequency regions, multiplex methods (FDMA,TDMA,CDMA, or hybrids), channel coding, error protocols or modulation methods.

The connection between the mobile station MS and the broadcast transmitting station PBT is so designed that only a one-sided communication from the broadcast transmitting station PBT to the mobile station MS is accomplished via the sending of the pilot channel PICH; that is, the communication function of the mobile station MS is limited to the reception of the pilot channel PICH. Subsequent to the generation and adaptation of the mobile station MS to the selected radio interface access method RIAS, the mobile station can set up a connection to the base station BTS in accordance with the radio interface access method RIAS. On this connection a further exchange of signalings takes place in accordance with the protocol of the mobile radiotelephone network.

Figure 2:
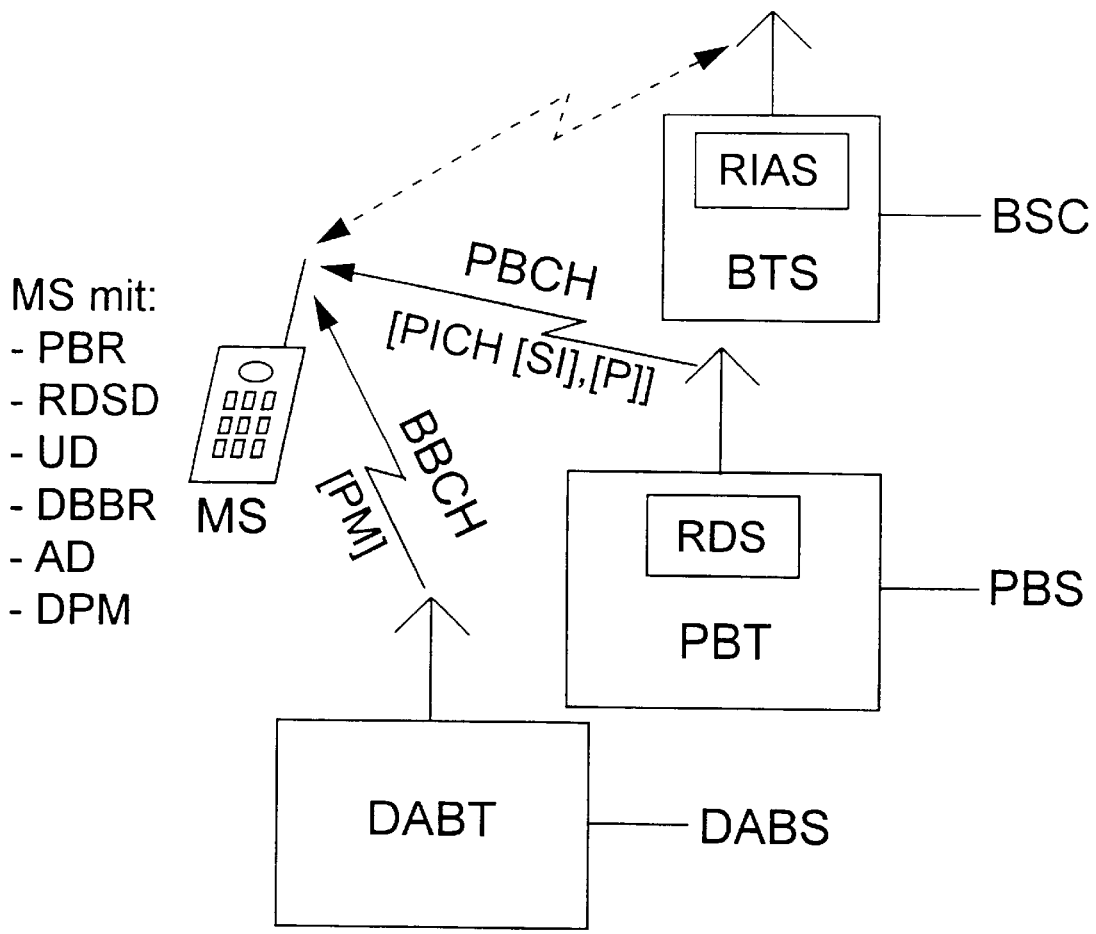
FIG. 2 shows a communication system as in FIG. 1, wherein the mobile station receives a radio transmission channel from a broadcast transmitting station of a public broadcast network as well as a broadband transmission channel from a digital broadcast transmitting station of a digital broadcast system.

FIG. 2 shows the communication system illustrated in FIG. 1, with an additional digital broadcast transmitting station DABT of a digital broadcast system DABS.

In FIG. 2 the broadcast transmitting station PBT is equipped with means for transmitting RDS information RDSI. The pilot channel PICH is sent on a radio transmission channel PBCH together with the RDS information RDSI. In order to receive the pilot channel PICH that is sent in this way, the pilot channel receiver PICHR in the mobile station MS is embodied an FM receiver PBR with an RDS decoder A RDSD embodied therein. The FM receiver PBR detects a radio transmission channel PBCH that conducts RDS information RDSI in the frequency spectrum of the public broadcast system PBS (for instance 87.5–108 Mhz), on which channel the pilot channel PICH with the signaling information SI is transmitted, preferably periodically. The evaluating device UD in the mobile station MS then selects a radio interface access method RIAS with the aid of the signaling information SI transmitted on the pilot channel PICH (as described in connection with FIG. 1) and generates an adaptation of the mobile station MS to this selected method. Subsequent to successful adaptation, the mobile station MS can set up a connection for purposes of exchanging signalings with the base station BTS.

Besides the pilot channel PICH, a pointer P also is transmitted on the radio transmission channel PBCH; that is, together with the RDS information RDSI. This pointer points to a broadband transmission channel BBCH on which at least one programming module PM is transmitted, preferably periodically. In an adaptation device AD in the mobile station MS, an adaptation to the selected radio interface access method RIAS of the mobile radiotelephone system is generated by the programming module PM. A switching device of digital signal processing (DSP, FPGA, etc.) is used as the adaptation means AD, for example. As illustrated, the broadband transmission channel BBCH can be sent by at least one digital broadcast transmitting station DABT in the frequency spectrum of a digital broadcast system DABS in the radio coverage area of the mobile radiotelephone system.

For the reception of the programing module PM, a digital broadband receiver DEBR that is laid out to the frequency spectrum of the digital broadcast system DABS is embodied in the mobile station MS. This receiver detects the broadband channel BBCH indicated by the pointer and receives the programming module PM.

With the aid of this described embodiment, a mobile station MS that is not multimode capable but that is laid out for a program-based adaptation also generates an adaptation to the selected radio interface access method RIAS.

Figure 3:
FIG. 3 shows the structure of a data packet with a header and a frame check sum, and the structure of a RDS frame with RDS information and a pilot channel.
Figure 3:
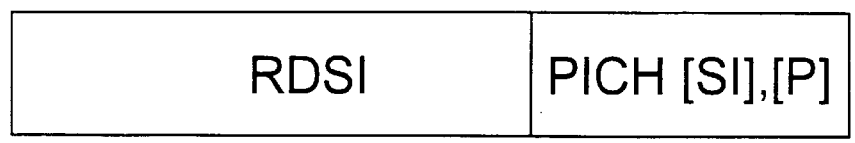

The programming modules also can be transmitted on the broadband transmission channel BBCH in data packets DP. A data packet memory DPM that is integrated in the mobile station MS stores the received data packets DP, which are provided with a header H and a frame check sum FS, respectively, so that the evaluating device UD can checked the successful reception of all data packets DP that are required for the generation of the adaptation to the radio interface access method RIAS. [sic] The general structure of such a data packet DP is illustrated in FIG. 3. Here, several bits for the header H and the frame check sum FCS are placed in front of or behind the bits of the data packet, respectively. FIG. 3 further illustrates the structure of an RDS frame. Here, additional bits of the pilot channel PI with the signaling information SI and the pointer P are appended to the bits of the RDS information RDSI, for example.

Figure 4:
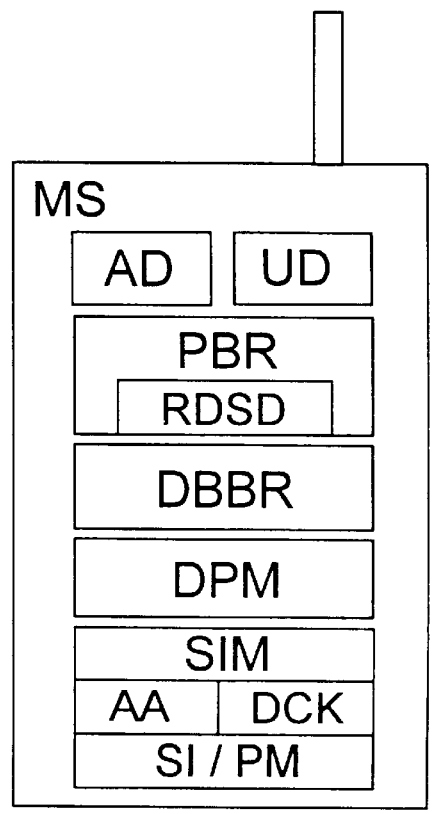
FIG. 4 shows a mobile station with associated components realized therein.

FIG. 4 illustrates a mobile station MS with the components described in the preceding Figures. A subscriber identification module SIM is additionally depicted, via which an access authorization AA is stored by means of which an authorization of the mobile station to receive the programing modules PM can be checked on the part of the mobile radiotelephone network. In addition, a decoding key DCK can be stored on the subscriber identification module SIM for decoding the programming modules PM that are transmitted encrypted.

It is also imaginable to store the signaling information SI or, respectively, programming modules PM on the subscriber identification module SIM so that the mobile station MS can generate an adaptation to a radio interface access method RIAS without the additional reception of this signaling information SI or of the programming modules PM. This is particularly appropriate for storing the radio interface access method RIAS that is supported in the home area of the mobile subscriber.

Although the present invention has been described with reference to specific embodiments, those of skill in the art will recognize that changes may be made thereto without departing from the spirit and scope of the invention as set forth in the hereafter appended claims.

I claim:

1. A method for adapting a mobile station which is located in a radio coverage area of a mobile radio telephone network to a radio interface access method which is supported by the mobile radio telephone network, the method comprising the steps of:

transmitting signaling information about at least one radio interface access method of the mobile radio telephone network on a pilot channel;

sending the pilot channel by at least one broadband transmitting station of a public broadcast system in the radio coverage area of the mobile radio telephone network;

receiving the pilot channel by the mobile station;

evaluating the pilot channel by the mobile station;

selecting, with the mobile station, a radio interface access method with the aid of the signaling information;

pointing, via a pointer that is transmitted on the pilot channel, to at least one broadband transmission channel on which at least one programming module is transmitted; and generating, with the mobile station, an adaptation to the selected radio interface access method of the mobile radio telephone network using the programming module.

2. A method for adapting a mobile station which is located in a radio coverage area of a mobile radio telephone network to a radio interface access method which is supported by the mobile radio telephone network as claimed in claim 1, further comprising the step of:

periodically transmitting the signaling information on the pilot channel.

3. A method for adapting a mobile station which is located in a radio coverage area of a mobile radio telephone network to a radio interface access method which is supported by the mobile radio telephone network as claimed in claim 1, the method further comprising the steps of:

sending the pilot channel on at least one radio transmission channel in a frequency spectrum of the public broadcast system together with RDS information;

detecting, via a pilot channel receiver that is constructed as an FM receiver with an RDSS decoder, a radio transmission channel that conducts RDS information; and receiving the pilot channel via the receiver.

4. A method for adapting a mobile station which is located in a radio coverage area of a mobile radio telephone network to a radio interface access method which is supported by the mobile radio telephone network as claimed in claim 1, the method further comprising the step of:

periodically transmitting the programming modules on the broadband transmission channel.

5. A method for adapting a mobile station which is located in a radio coverage area of a mobile radio telephone network to a radio interface access method which is supported by the mobile radio telephone network as claimed in claim 1, the method further comprising the steps of:

sending the broadband transmission channel in a frequency spectrum of a digital broadcast system by at least one digital broadcast transmitting station in the radio coverage area of the mobile radio telephone network; and receiving the program modules via a digital broadband receiver in the mobile station which is laid out to the frequency spectrum of the digital broadcast system.

6. A method for adapting a mobile station which is located in a radio coverage area of a mobile radio telephone network to a radio interface access method which is supported by the mobile radio telephone network as claimed in claim 1, the method further comprising the step of:

periodically transmitting the program modules on the broadband transmission channel in at least one data packet.

7. A method for adapting a mobile station which is located in a radio coverage area of a mobile radio telephone network to a radio interface access method which is supported by the mobile radio telephone network as claimed in claim 6, the method further comprising the step of:

storing the data packets in a data packet memory in the mobile station.

8. A method for adapting a mobile station which is located in a radio coverage area of a mobile radio telephone network to a radio interface access method which is supported by the mobile radio telephone network as claimed in claim 6, the method further comprising the steps of:

placing a header and a frame check sum at the front and back of every data packet, respectively; and checking, via the header and the frame check sum, whether the programming modules that are required for the adaptation of the mobile station to the radio interface access method have been successfully received in the mobile station.

9. A method for adapting a mobile station which is located in a radio coverage area of a mobile radio telephone network to a radio interface access method which is supported by the mobile radio telephone network as claimed in claim 1, the method further comprising the step of:

transmitting the program modules on the broadband transmission channel encrypted.

10. A method for adapting a mobile station which is located in a radio coverage area of a mobile radio telephone network to a radio interface access method which is supported by the mobile radio telephone network as claimed in claim 9, the method further comprising the step of:

decrypting the encrypted programming modules via a decoder key that is stored in a subscriber identification module.

11. A method for adapting a mobile station which is located in a radio coverage area of a mobile radio telephone network to a radio interface access method which is supported by the mobile radio telephone network as claimed in claim 1, the method further comprising the step of:

storing an access authorization for receiving the programming modules in a subscriber identification module.

12. A method for adapting a mobile station which is located in a radio coverage area of a mobile radio telephone network to a radio interface access method which is supported by the mobile radio telephone network as claimed in claim 1, the method further comprising the step of:

storing the signaling information for generating the adaptation of the mobile station to the radio interface access method in a subscriber identification module.

13. A method for adapting a mobile station which is located in a radio coverage area of a mobile radio telephone network to a radio interface access method which is supported by the mobile radio telephone network as claimed in claim 1, the method further comprising the step of:

storing the programming modules for generating the adaptation of the mobile station to the radio interface access method in a subscriber identification module.

14. A mobile station for adaptation to a radio interface access method that is supported by a mobile radio telephone network, the mobile station comprising:

a pilot channel receiver for receiving a pilot channel having signaling information about at least one radio interface access method, the channel being sent by at least one broadcast transmitting station of a public broadcast system and capable of pointing to at least one broadband transmission channel on which at least one programming module is transmitted; and an evaluating device for evaluating the signaling information that is transmitted on the pilot channel for purposes of selecting a radio interface access method and adapting the mobile station to the selecting radio interface access method using the programming module.

15. A mobile station for adaptation to a radio interface access method that is supported by a mobile radio telephone network as claimed in claim 14, wherein the pilot channel receiver includes an FM receiver with an RDS decoder which detect a radio transmission channel that conducts RDS information in a frequency spectrum of the public broadcast system and receive the pilot channel that is sent with the RDS information.

16. A mobile station for adaptation to a radio interface access method that is supported by a mobile radio telephone network as claimed in claim 14, further comprising:

an adaptation device for adapting the mobile station to the radio interface access method via at least one programming module which is transmitted on a broadband transmission channel.

17. A mobile station for adaptation to a radio interface access method that is supported by a mobile radio telephone network as claimed in claim 16, further comprising:

a digital broadband receiver which is laid out to the frequency spectrum of a digital broadcast system, the digital broadband receiver detecting a broadband transmission channel of a digital broadcast system, the channel being indicated by a pointer that is transmitted on the pilot channel, and receiving the programming modules that are transmitted on the broadband transmission channel.

18. A mobile station for adaptation to a radio interface access method that is supported by a mobile radio telephone network as claimed in claim 16, further comprising:

a data packet memory for storing the programming modules that are transmitted in at least one data packet.

19. A mobile station for adaptation to a radio interface access method that is supported by a mobile radio telephone network as claimed in claim 16, wherein the evaluating device evaluates the data packets and checks the complete reception of the programming module with the aid of a header and a frame check sum that are placed at the front and back of the data packets, respectively.

20. A communication system for adapting a mobile station which is located in a radio coverage area of a mobile radio telephone network with one or more base station to a radio interface access method which is supported by the mobile radio telephone network, the communication system comprising:

at least one broadcast transmitting station of a public broadcast system, the station sending a pilot channel with signaling information about at least one radio interface access method in the radio coverage area of the mobile radio telephone network wherein the pilot channel is capable of pointing to at least one broadband transmission channel on which at least one programming module is transmitted; and a mobile station which selects a radio interface access method with the aid of the signaling information and generates an adaptation to the selected radio interface access method of the mobile radio telephone network using the programming module.

21. A communication system for adapting a mobile station which is located in a radio coverage area of a mobile radio telephone network with one or more base stations to a radio interface access method which is supported by the mobile radio telephone network as claimed in claim 20, further comprising:

at least one digital broadcast transmitting station of a digital broadcast system in the radio coverage area of the mobile radio telephone network, the at least one digital broadcast transmitting station transmitting at least one programming module on a broadband transmission channel indicated by a pointer which is transmitted on the pilot channel, wherein the mobile station generates an adaptation to the selected radio interface access method using the at least one programming module.

* * * * *